UNITED STATES PATENT OFFICE 2,418,897

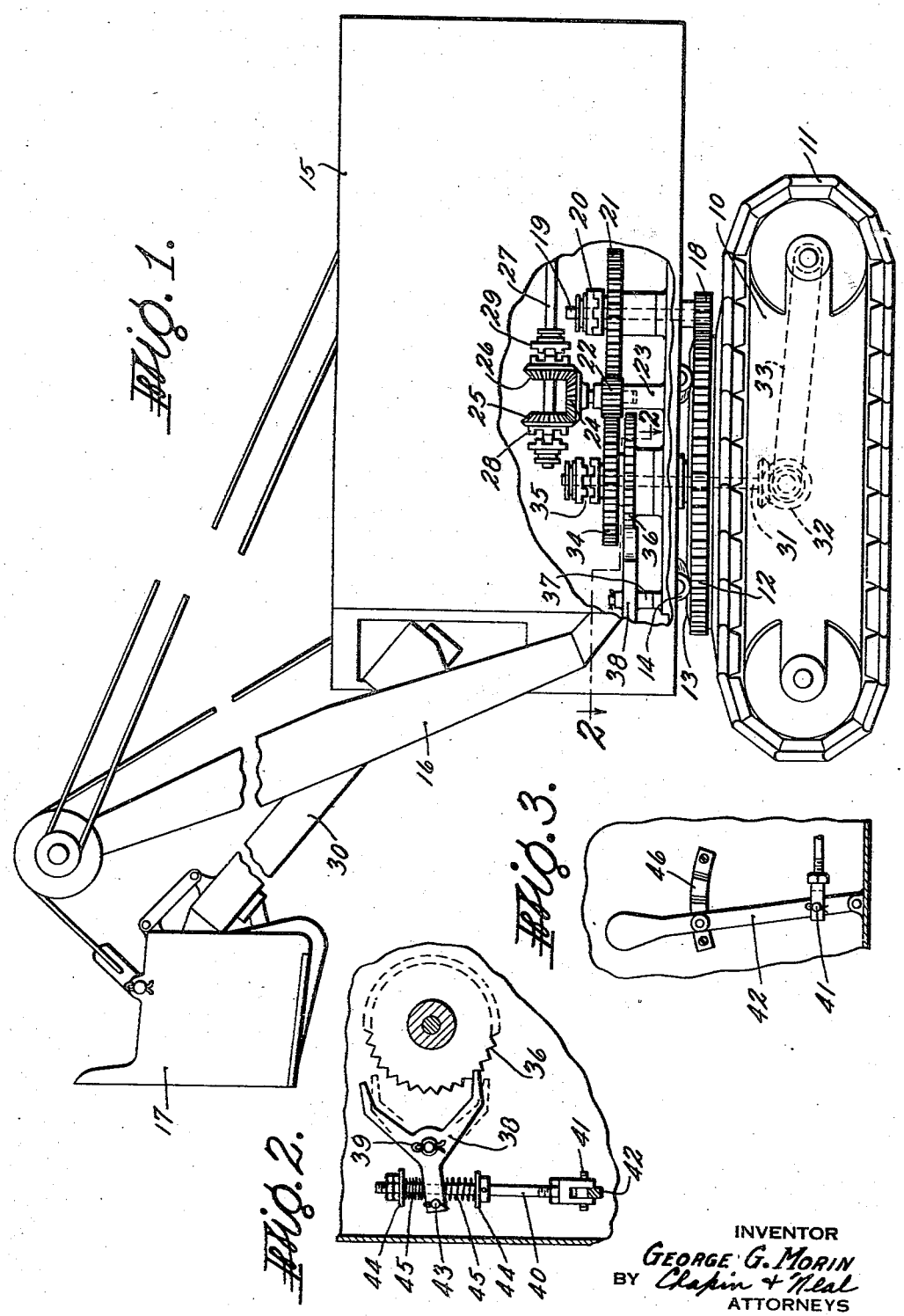

CREEPING MECHANISM FOR POWER SHOVELS

George G. Morin, South Hadley Falls, Mass.

Application October 11, 1945, Serial No. 621,733

4 Claims. (Cl. 214—132)

Power driven shovels, cranes and the like are usually provided with a Caterpillar mount deriving its power from the same prime mover that furnishes power for the swing, lift and crowd. The several clutches are usually arranged so that the Caterpillar drive cannot be operated at the same time as the other motions. Even in those cases where the Caterpillar drive is independently actuable its speed is too high to permit it to be in operation while the shovel or crane is working. It is thus necessary, in work requiring progressive advance of the shovel, to interrupt the work periodically to bring the shovel to a new position.

I have herein provided a simple mechanism, readily attachable to existing shovels, by which the shovel may be caused to creep intermittently at a slow rate in either direction while in operation without interfering with the use of the regular travel or traction mechanism when it is desired to move the shovel bodily at a higher rate. This is accomplished by causing the Caterpillar drive to be actuated periodically by one of the other drives. For this purpose I prefer to use the swing, as it lends itself best to a simple mechanical connection, is normally burdened with a lesser load, and further is generally used once for each shovel loading operation whereas the lift and crowd may be used several times in obtaining a single load. The use of the swing drive is thus steadier in operation.

One manner in which these results can be accomplished is shown in the accompanying drawing, in which Fig. 1 is a side elevation, partly broken away, of one form of power shovel to which my invention may be applied;

Fig. 2 is a section on line 2—2 of Fig. 1; and

Fig. 3 is a detail.

The shovel is mounted on a base 10 having a Caterpillar tread 11 of usual construction the details of which have not been shown. Fixed to this base is a bull gear 12 the top of which is beveled at 13 to serve as bearings for rolls 14 supporting the cab 15, which thus may turn from side to side around the axis of the gear to carry the boom 16 and shovel 17 laterally. To cause this rotation or swing of the cab and boom a pinion 18 in mesh with the bull gear is carried by a shaft 19 journaled on the cab. This shaft may be coupled by a dog clutch 20 to a gear 21 meshing with a pinion 22 mounted on a post 23. The shaft of this pinion has a bevel gear 24 meshing with bevel gears 25 and 26 free on the main power shaft 27 and clutchable to it by dogs 28 and 29 so as to rotate the pinion 21 in either direction. The drive for the main power shaft has not been shown as any desired source of power may be used. Suitable drives, not shown, may be used for lifting the boom and moving thte dipper stick 30 out and back.

With the clutch 20 engaged the cab and shovel may be swung to one side or the other by throwing in either one of clutches 28 or 29. In accordance with this invention this movement is used to cause motion of the Caterpillar either forward or back by a selectively directed one way connection with part of the normal Caterpillar drive. This normal drive includes a shaft 31 coaxial with the main rotational axis of the cab. The shaft has been shown as connected to the Caterpillar drive through bevel gearing 32 and a chain 33, but this is suggestive only and any form of drive may be used. A gear 34 meshing with the pinion 22 is free on shaft 31 and may be clutched to it by a dog clutch 35. When the clutch is engaged the Caterpillar will be driven from the main power shaft 27 in a direction determined by selection of the clutches 28 and 29.

The creeping drive which is derived from the swinging of the cab utilizes a two way ratchet 36 fixed to shaft 31 and conveniently located below gear 34 which it will be remembered is free on the shaft unless positively clutched to it. On a post 37 on the floor of the cab is a two armed pawl 38 shaped somewhat like a clock escapement. It is preferably secured only by a cotter pin 39 to permit easy removal. Through a slot in the rear of the double pawl passes a rod 40 pivoted at 41 to a control handle 42 (Fig. 3). The slot may be closed by a readily removable pin 43 to keep the rod in position. The rod is provided on each side of the pawl with a collar 44 between which and the pawl is a compression spring 45. The handle 42 is pivoted to the floor and has a control segment 46 of any desired type having notches to hold the handle in a central position in which the pawl is held in the dotted line position of Fig. 2 out of all contact with the pawl and with two opposed positions in which one leg or the other of the pawl is spring pressed against the ratchet.

Whenever it is desired to have the shovel creep forwardly in order to keep up with the progress of the excavation the handle 42 is placed in the appropriate notch and left there. As the shovel is operated in the usual way the cab will swing from side to side periodically. Since the clutch 35 is disengaged the ratchet 36 tends to remain stationary with gear 34 revolving freely above it.

When the cab swings one way the pawl 38 will click freely over the ratchet, but when the cab returns the pawl will engage and push the ratchet around. Since the ratchet is positively connected to the Caterpillar drive the shovel will be moved ahead during each swing of the cab with no further attention on the part of the operator until such time as the shovel position requires readjustment. If it is creeping ahead too fast the handle is put in the neutral position for a few swings. If it moves too slowly, or requires a major change in position, the handle 42 is put in neutral and the regular travel drive is used.

To prevent damage to the Caterpillar drive or to the ratchet mechanism customarily provided to prevent undesired backward movement of the shovel, it is desirable to have the pawl 38 relatively weak. In this way, if the creeping mechanism is inadvertently put in operation so as to oppose the caterpillar drive or the track holding dogs, the readily replaceable pawl 38 will be broken rather than the inaccessible drive or holding dogs of the Caterpillar track.

I claim:

1. Creeping mechanism for self propelled power shovels and the like of the type having a base, traction means thereon, a shovel support rotatable around a vertical axis on the base, and a traction drive having a shaft extending along said axis, comprising a ratchet fixed to said shaft, one or more pawls carried by the shovel support, and means for pressing at least one of said pawls against the ratchet, whereby said traction mechanism will be operated during swinging movement of the shovel support in one direction.

2. Creeping mechanism for self propelled power shovels and the like of the type having a base, propelling means thereon, a shovel support rotatable around a vertical axis on the base, and a propelling drive having a shaft extending along said axis, comprising a ratchet fixed to said shaft, a pawl support carried by the shovel support adjacent the ratchet and bearing a pair of oppositely directed pawls of such length that in a central position of the pawl support neither pawl engages the ratchet, a pair of springs engaging opposite sides of the ratchet support, and means for stressing either of the springs selectively to bring one of the pawls yieldingly against the ratchet whereby swinging of the shovel support will cause unidirectional intermittent movement of the propelling drive shaft.

3. Creeping mechanism for self propelled power shovels and the like, comprising a power source, traction mechanism, clutch means for connecting the power source to the traction mechanism, clutch means connecting the power source to a shovel moving means, and a one-way clutch connectable between said shovel moving means and the traction mechanism when said first mentioned clutch means is disengaged, whereby the traction mechanism will be operated at a creeping rate by motion of the shovel in one direction only.

4. Creeping mechanism for self propelled power shovels and the like, comprising a power source, swing and traction mechanism independently operable from the shovel, a releasable and reversible one way clutch between the swing mounting of the shovel and the traction mechanism to operate the traction mechanism upon each movement of the swing in one direction.

GEORGE G. MORIN.

REFERENCES CITED

The following references are of record in the file of this patent:

UNITED STATES PATENTS

| Number | Name | Date |
| --- | --- | --- |
| 1,545,805 | White | July 14, 1925 |
| 186,006 | Hess | Jan. 9, 1877 |
| 1,979,028 | Ewart | Oct. 20, 1934 |
| 2,062,385 | Wilson | Dec. 1, 1936 |